(12) United States Patent
Hotta et al.

(10) Patent No.: US 8,002,341 B2
(45) Date of Patent: Aug. 23, 2011

(54) ROLL SUNSHADE DEVICE

(75) Inventors: Kouichi Hotta, Tochigi (JP); Hiroyuki Tsukamoto, Tochigi (JP); Hisanori Fukuda, Tochigi (JP); Yoshikazu Ikeda, Tochigi (JP)

(73) Assignee: Yachiyo Industry Co., Ltd., Saitama (JP)

( * ) Notice: Subject to any disclaimer, the term of this patent is extended or adjusted under 35 U.S.C. 154(b) by 0 days.

(21) Appl. No.: 12/637,200

(22) Filed: Dec. 14, 2009

(65) Prior Publication Data

US 2010/0148540 A1   Jun. 17, 2010

(30) Foreign Application Priority Data

Dec. 12, 2008   (JP) .................................. 2008-316406

(51) Int. Cl.
 *B60J 7/00* (2006.01)
(52) U.S. Cl. ........................................ 296/214; 160/265
(58) Field of Classification Search .................. 296/214; 160/265, 312
See application file for complete search history.

(56) References Cited

U.S. PATENT DOCUMENTS

| 1,803,883 | A | * | 5/1931 | Weaver | 160/202 |
| 3,836,147 | A | * | 9/1974 | Shapiro | 473/420 |
| 5,479,979 | A | * | 1/1996 | Hayashiguchi | 160/265 |
| 7,204,548 | B2 | * | 4/2007 | Wilms et al. | 296/214 |
| 7,287,811 | B2 | * | 10/2007 | Sanders et al. | 296/214 |
| 7,568,752 | B1 | | 8/2009 | Lin | |
| 2005/0051283 | A1 | * | 3/2005 | Chatellard et al. | 160/265 |

FOREIGN PATENT DOCUMENTS

| DE | 199 10 830 C1 | 6/2000 |
| DE | 100 64 718 C1 | 3/2002 |
| DE | 10 2006 035632 A1 | 2/2008 |
| DE | 10 2006 038540 A1 | 2/2008 |
| EP | 1 433 634 A1 | 6/2004 |
| EP | 2 062 766 A1 | 5/2009 |
| EP | 2 098 395 A1 | 9/2009 |
| FR | 2 878 558 A1 | 6/2006 |
| JP | 2004-044253 | 2/2004 |
| JP | 2004-099031 A | 4/2004 |

* cited by examiner

*Primary Examiner* — Dennis H Pedder
(74) *Attorney, Agent, or Firm* — Arent Fox LLP

(57) ABSTRACT

A roll sunshade device, which includes a screen for shadowing an inner opening of a roof of a vehicle, a rotating body which is disposed ahead of the inner opening or behind the inner opening in a front-rear direction of the vehicle and rotates freely around an axis in a vehicle width direction, a turning member which is disposed at a predetermined distance from the rotating body in the front-rear direction of the vehicle and rotates freely around an axis in the vehicle width direction, and two circular wires which are disposed on both sides of the inner opening in the vehicle width direction, respectively and hung between the rotating body and the turning member, in which both edge portions of the screen in the vehicle width direction are supported by the two circular wires, respectively, and when the screen is slid in the front-rear direction of the vehicle from a state where the screen shadows the inner opening, the screen is folded along an outer circumferential surface of the turning member.

2 Claims, 5 Drawing Sheets

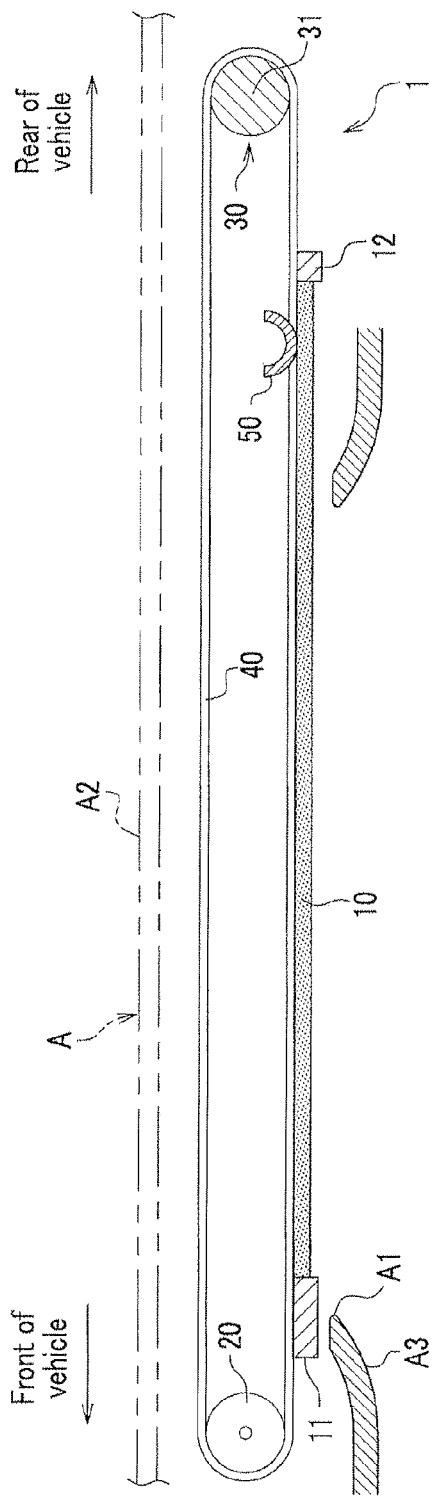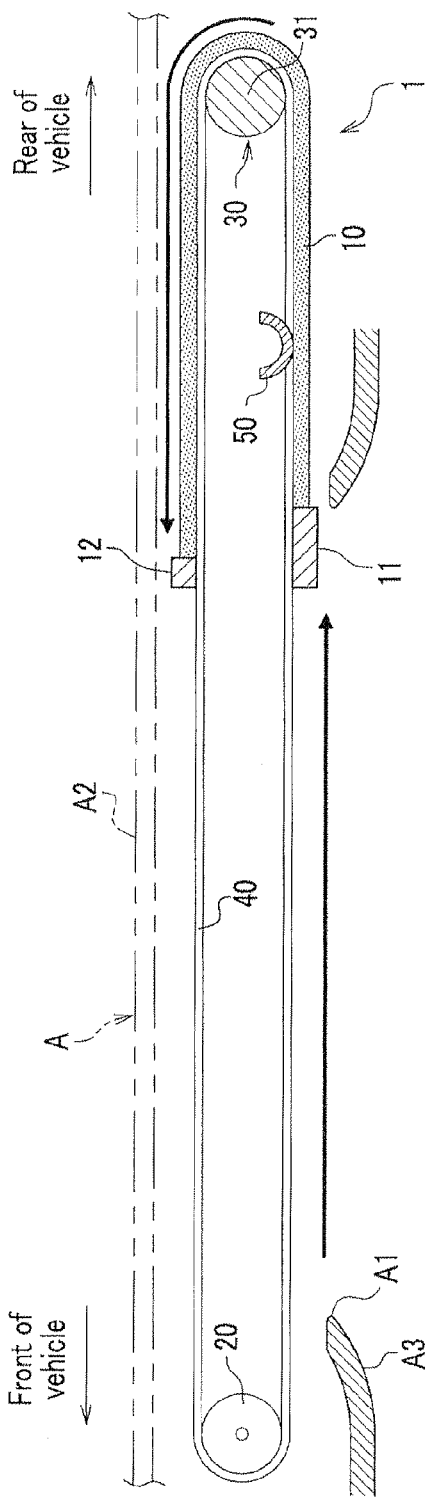

ROLL SUNSHADE DEVICE

CROSS REFERENCE TO RELATED APPLICATIONS

This application claims the foreign priority benefit under Title 35, United States Code, §119(a)-(d) of Japanese Patent Application No. 2008-316406, filed on Dec. 12, 2008, the contents of which are hereby incorporated by reference.

BACKGROUND OF THE INVENTION

1. Field of the Invention

The present invention relates to a roll sunshade device which is fixed to an inner opening of a vehicle roof.

2. Description of Related Art

As a roll sunshade device which is fixed to an inner opening of a vehicle roof, the following device has been known, which includes a screen shielding the inner opening of the vehicle roof, two guide bars disposed on each side of the inner opening in the vehicle width direction and extending in a front-rear direction of the vehicle, and a rolling shaft which is disposed in a rear portion of the inner opening and rotatable around an axis in the vehicle width direction. A rear edge portion of the screen is fixed to the rolling shaft (For example, see paragraph [0017] and FIG. 1 in JP2004-099031).

In the conventional roll sunshade device described above, when the screen is slid rearward from a closing state of the screen, the screen is rolled up by the rolling shaft and housed in a space between an outer roof panel and an interior headlining board of the vehicle. Therefore, in the conventional roll sunshade device, it is required to widen a distance between the outer roof panel and the interior headlining board of the vehicle to secure a space for housing a rolled screen which has a large diameter due to rolling of the screen on the rolling shaft. As a result, the headlining board is lowered and an indoor height becomes small.

It is, therefore, an object of the present invention to provide a roll sunshade device which can reduce a height of a space for housing a screen, and thereby securing a large indoor height by solving the foregoing problem.

SUMMARY OF THE INVENTION

According to a first aspect of the present invention to solve the above issues, there is provided a roll sunshade device, which comprises a screen for shadowing an inner opening of a roof of a vehicle, a rotating body which is disposed ahead of the inner opening or behind the inner opening in a front-rear direction of the vehicle and rotates freely around an axis in a vehicle width direction, a turning member which is disposed at a predetermined distance from the rotating body in the front-rear direction of the vehicle and rotates freely around an axis in the vehicle width direction, and two circular wires which are disposed on both sides of the inner opening in the vehicle width direction, respectively and hung between the rotating body and the turning member, in which both edge portions of the screen in the vehicle width direction are supported by the two circular wires, respectively, and when the screen is slid in the front-rear direction of the vehicle from a state where the screen shadows the inner opening, the screen is folded along an outer circumferential surface of the turning member.

In this configuration, when the screen is opened, the screen is housed between an outer roof panel of the vehicle and an interior headlining board with being folded in the front-rear direction of the vehicle. Therefore, a height of a space for housing the screen can be reduced, and accordingly, a large indoor height can be secured in comparison with the conventional structure, where the screen is rolled up in a roll.

In addition, in the roll sunshade device according to the first aspect, it is preferable that an elastic member is provided at least in the rotating body or the turning member, and at least the rotating body or the turning member receives a force by the elastic member in a direction that the rotating body and the turning member leave each other.

In this configuration, since the rotating body and the turning member receive a force in the direction that the rotating body and the turning member leave each other, the wires which are hung between the rotating body and the turning member are stretched in the front-rear direction. Therefore, the screen whose both edge portions are fixed to both wires, respectively is also stretched. Accordingly, the screen is prevented from slacking and rucking.

According to a roll sunshade device of the present invention, a height of a space for housing the screen can be reduced, and accordingly, a large indoor height can be secured.

BRIEF DESCRIPTION OF THE DRAWINGS

FIG. 3A is a side cross sectional view showing a closing state of a screen in a roll sunshade device according to the embodiment;

FIG. 3B is a side cross sectional view showing an opening state of the screen in the roll sunshade device according to the embodiment;

DETAILED DESCRIPTION OF THE PREFERRED EMBODIMENT

Next, an embodiment of the present invention will be explained in detail by referring to drawings as appropriate.

Figure 1:
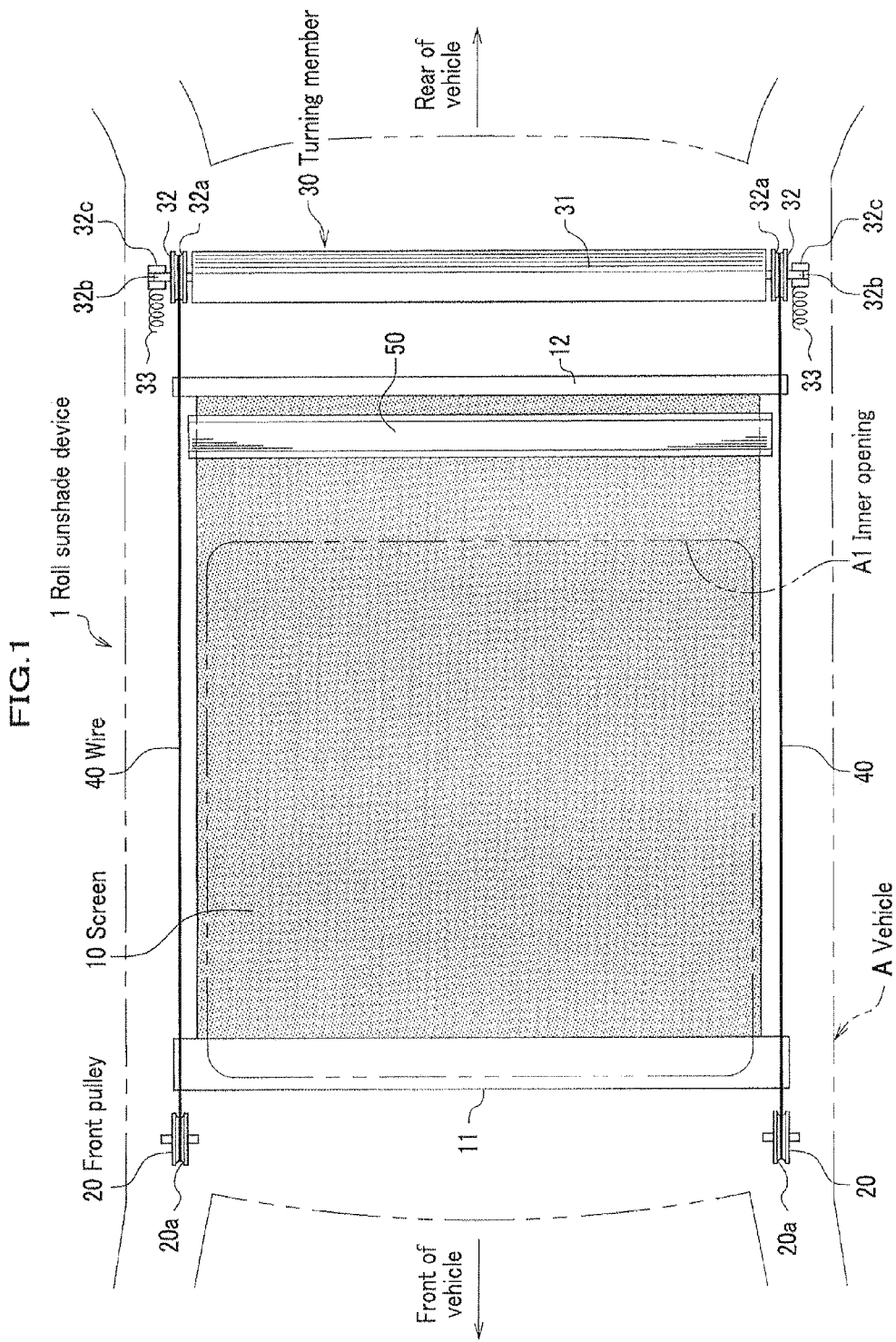
FIG. 1 is a plane view showing a roll sunshade device according to an embodiment of the present invention.

A roll sunshade device 1 according to the embodiment is, as shown in FIG. 1, a device for conducting daylighting and shading of an inner opening A1 formed in a roof of a vehicle A, and the inner opening A1 can be freely opened and closed by sliding a screen 10 which is disposed above the inner opening A1.

It is noted that in the explanation below, a front-rear direction corresponds a traveling direction of the vehicle A.

The roll sunshade device 1 includes the screen 10 for shadowing the inner opening A1 of the vehicle A, two front pulleys 20, 20 (rotating body) disposed on each side of the inner opening A1 in the vehicle width direction, a turning is member 30 disposed in a rearward of the front pulleys 20, 20 at a predetermined distance, and two circular wires 40, 40 which are disposed on each side of the inner opening A1 in the vehicle width direction and hung between the respective front pulleys 20, 20 and the turning member 30.

As shown in FIG. 3A, the screen 10 is a clothe member which is disposed between an outer roof panel A2 of the vehicle A and an interior headlining board A3 and shadows the inner opening A1 (see FIG. 1) formed in the headlining board A3 from above.

It is noted that an outer opening (not shown) is formed in the outer roof panel A2 of the vehicle A at a position facing the inner opening A1, and a glass is fit in the outer opening.

As shown in FIG. 1, the screen 10 is formed in a rectangular shape in plan view and a longitudinal direction of the screen 10 is in the front-rear direction. A front stay 11 is fixed to a front edge portion of the screen 10 and a rear stay 12 is fixed to a rear edge portion of the screen 10.

Meanwhile, a material of the screen 10 is not limited as long as the material has a shadowing property and flexibility for folding the material in the front-rear direction.

The front stay 11 is a member made of metal or resin and fixed to the screen 10 along the front edge portion of the screen 10. A cross section of the front stay 11 has a rectangular shape (see FIG. 2). Both end portions of the front stay 11 extend outside more than the respective end portions of the screen 10 in the screen width direction, and are slidably fit in right and left guide frames (not shown) extending in the front-rear direction of the vehicle A.

The rear stay 12 is a member made of metal or resin and fixed to the screen 10 along the rear edge portion of the screen 10. A cross section of the rear stay 12 has a rectangular shape (see FIG. 2). Both end portions of the rear stay 12 extend outside more than the respective end portions of the screen 10 in the screen width direction.

Since the foregoing front stay 11 and the rear stay 12 are fixed to the screen 10 along the front edge portion and the rear edge portion of the screen 10, respectively, the screen 10 is stretched in the screen width direction.

In addition, the front stay 11 has a role of a handle when a passenger of the vehicle slides the screen 10 in the front-rear direction.

Figure 2:
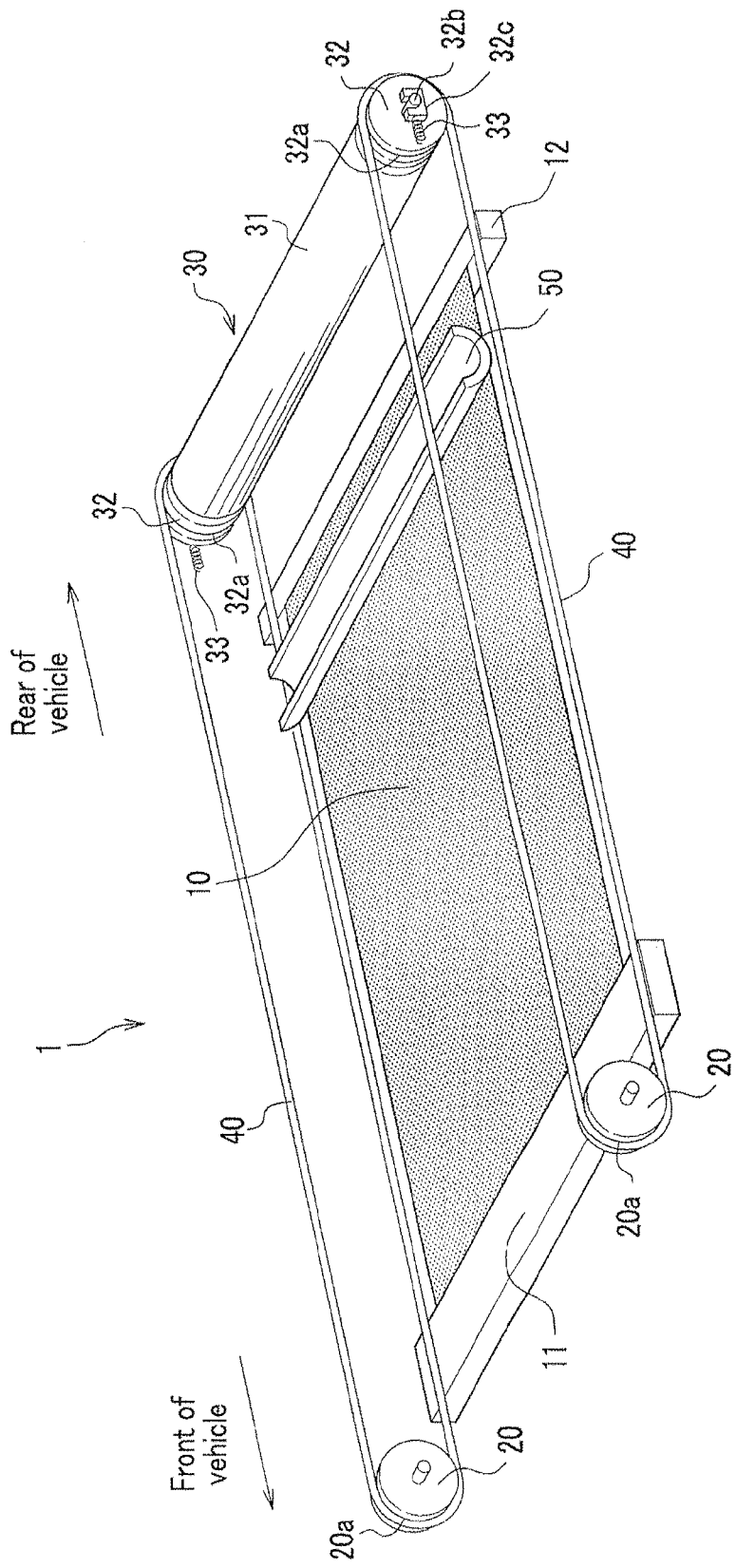
FIG. 2 is a perspective view showing a roll sunshade device according to the embodiment.

The front pulley 20 (rotating body) is, as shown in FIG. 2, a rotating body made of metal or resin, where a circumferential surface is formed around an axis in the vehicle width direction, and a wire groove 20a is formed on an outer circumferential surface of the front pulley 20 in the circumferential direction.

The front pulley 20 is rotatably supported by the guide frame (not shown) of the vehicle A (see FIG. 1) around an axis in the vehicle width direction, and as shown in FIG. 3A, disposed at a position ahead of the inner opening A1 and between the outer roof panel A2 of the vehicle A and the interior headlining board A3.

Meanwhile, in the embodiment, as shown in FIG. 1, the two front pulleys 20, 20 are arranged at positions ahead of the inner opening A1 and on each side (outside) of the inner opening A1 in the vehicle width direction, respectively. However, a columnar rotating body whose axis is arranged in the vehicle width direction may be arranged in front of the inner opening A1 and a wire groove may be formed in each end portion of the columnar rotating body.

The turning member 30 is, as shown in FIG. 3A, arranged behind the inner opening A1 and between the outer roof panel A2 of the vehicle A and the interior headlining board A3. The turning member 30 includes, as shown in FIG. 2, a columnar roller 31 whose axis is arranged in the vehicle width direction and two rear pulleys 32, 32 each of which is fixed to each end portion of the roller 31.

The roller 31 is a member made of metal or resin, whose axis is arranged in the vehicle width direction and a circumferential surface is formed around the axis in the vehicle width direction.

The roller 31 is supported slidably in the front-rear direction as well as rotatably around the axis in the vehicle width direction by a guide frame (not shown) of the vehicle A (see FIG. 1). In the embodiment, each of the rear pulleys 32, 32 is fixed to each end portion of the roller 31, and the roller 31 is supported by the guide frame through the rear pulleys 32, 32 arranged on both sides of the roller 31, respectively.

The two rear pulleys 32, 32, which are fixed to the both end portions of the roller 31, respectively, are rotating bodies made of metal or resin, whose circumferential surface is formed around an axis in the vehicle width direction and a wire groove 32a is formed on the circumferential surface in the circumferential direction. In the embodiment, a diameter of the wire groove 32a of the rear pulley 32 is formed identical to that of the wire groove 20a of the front pulley 20.

The rear pulley 32 is supported slidably in the front-rear direction as well as rotatably around an axis in the vehicle width direction, by the guide frame (not shown) of the vehicle A (see FIG. 1).

The rear pulleys 32, 32 on each side of the roller 31 are arranged coaxially with the roller 31, and the roller 31 rotates in conjunction with rotations of the rear pulleys 32, 32 on each side of the roller 31. In addition, the roller 31 slides in the front-rear direction in conjunction with sliding of the rear pulleys 32, 32 on each side of the roller 31 in the front-rear direction.

In addition, as shown in FIG. 1, the rear pulleys 32, 32 on each side of the roller 31 are arranged behind the front pulleys 20, 20 at a predetermined distance. The wire grooves 20a, 32a, which are the wire grooves of a pair of the front pulley 20 and the rear pulley 32 in the front-rear direction, are arranged in line.

In the rear pulley 32, a spindle 32b which is projected outside in the vehicle width direction is rotatably supported by a bearing member 32c, and an elastic member 33 is fixed to the bearing member 32c.

The elastic member 33 according to the embodiment is a coil spring whose axis direction is arranged in the front-rear direction. A rear end portion of the elastic member 33 is fixed to the bearing member 32c and a front end portion of the elastic member 33 is fixed to a guide frame (not shown) of the vehicle A.

The elastic member 33 is disposed between the bearing member 32c and the guide frame (not shown) with a compressed condition, and pushes the turning member 30 (roller 31, rear pulleys 32, 32) rearward by the elastic force thereof. Namely, the turning member 30 is receiving a force in a direction (rearward) leaving from the front pulleys 20, 20 by the two elastic members 33, 33.

The wire 40 is, as shown in FIG. 2, a circular wire body which is hung between a pair of the front pulley 20 and the rear pulley 32 (turning member 30) in the front-rear direction. As shown in FIG. 1, the two wires 40, 40 are disposed on both sides (outside) of the inner opening A1 in the vehicle width direction, respectively. The wire 40 is fit in the wire grooves 20a, 32a of the front pulley 20 and the rear pulley 32.

Both end portions of the front stay 11 and the rear stay 12 are fixed to the respective wires 40, 40, and both edge portions of the screen 10 in the vehicle width direction are supported by the respective wires 40, 40 through the front stay 11 and the rear stay 12. As shown in FIG. 3A, when the screen 10 entirely shadows the inner opening A1 of the vehicle A, the front stay 11 and the rear stay 12 are located in a lower side linear portion of the circular wire 40.

Meanwhile, the both edge portions of the screen 10 in the vehicle width direction may be directly supported by the wires 40, 40, respectively without using the front stay 11 and the rear stay 12.

In addition, as shown in FIG. 2, a guide member 50 which is in contact with an upper surface of the screen 10 is disposed at a position ahead of the turning member 30 and behind the inner opening A1 of the vehicle A (see FIG. 1).

The guide member 50 is a plate-like member made of resin extending in the vehicle width direction, and both end portions of the guide member 50 are fixed to a guide frame (not shown) of the vehicle A (see FIG. 1). The guide member 50 is curved in a circular arc so that a curvature around an axis in the vehicle width direction protrudes downward.

As shown in FIG. 3A, a bottom surface of the guide member 50 is in contact with an upper surface of the screen 10, and the upper surface of the screen 10 is pushed by the guide member 50. Therefore, a lower surface of the screen 10 is maintained at a height close to the height of opening edge portion of the inner opening A1.

The roll sunshade device 1 configured as described above operates as follows and achieves advantages of the present invention.

As shown in FIG. 3A, when the screen 10 entirely shadows the inner opening A1 of the vehicle A, the lower surface of the screen 10 is close to the opening edge portion of the inner opening A1 since the upper portion of the screen 10 is pushed by the guide member 50.

In addition, as shown in FIG. 2, since the wires 40, 40 on the respective sides are stretched in the front-rear direction by the elastic members 33, 33 which are provided in the rear pulleys 32, 32 on the respective sides, the screen 10 whose respective edge portions in the vehicle width direction are supported by the wires 40, 40 is stretched in the front-rear direction.

In addition, the screen 10 is also stretched in the vehicle width direction by the front stay 11 and the rear stay 12 which are fixed to the front edge portion and the rear edge portion of the screen 10, respectively.

As described above, since the screen 10 is stretched in the front-rear direction and in the vehicle width direction, the screen 10 is prevented from slacking and rucking.

As shown in FIG. 3B, when the screen 10 is opened, a passenger in the vehicle moves the front stay 11 in the rearward direction. Then, the respective wires 40, 40, to which the respective end portions of the front stay 11 are fixed, rotate in the counterclockwise direction in FIG. 3B, and the screen 10 slides rearward in conjunction with rotations of the wires 40, 40.

A rear edge portion of the screen 10 which is slid rearward circumferentially moves upward along the roller 31 and turns in the front-rear direction. Therefore, the screen 10 is folded in the front-rear direction, and the rear edge portion of the screen 10 overlaps with the front edge portion thereon.

When the inner opening A1 is entirely opened by moving the front stay 11 to the rear edge portion of the inner opening A1, the screen 10 is folded in half and housed between the outer roof panel A2 of the vehicle A and the interior headlining board A3.

In the roll sunshade device 1 according to the embodiment, since the screen 10 is folded in the front-rear direction, a height of a space for housing the screen 10 can be reduced, and accordingly, a large indoor height can be secured in comparison with the conventional structure, where the screen 10 is rolled up in a roll.

Meanwhile, when the screen 10 is closed, the folded screen 10 can be pulled out in the inner opening A1 by moving the front stay 11 forward in a reverse manner of opening the screen 10.

The embodiment of the present invention has been explained. However, the present invention is not limited to the foregoing embodiment, and can be modified in various forms as appropriate without departing from the spirits of the present invention.

For example, in the embodiment, as shown in FIG. 1, the front pulley 20 is disposed in a front portion of the vehicle A and the turning member 30 is disposed in a rear portion of the vehicle A. However, the turning member 30 may be disposed in the front portion of the vehicle A and the pulley 20 (rotating body) may be disposed in the rear portion of the vehicle A. In this feature, when the screen 10 is opened, the screen 10 is slid forward and the screen 10 is housed in a space ahead of the inner opening A1.

In addition, in the embodiment, as shown in FIG. 3A, the screen 10 is opened and closed by manually moving the front stay 11 by a passenger in the vehicle. However, the screen 10 may be opened and closed by installing a driving motor in the front pulley 20 or the turning member 30, thereby rotating the front pulley 20 or the turning member 30 through operation of the driving motor by a switch or the like in the vehicle.

In addition, in the embodiment, as shown in FIG. 2, the turning member 30 receives a force from the elastic member 33, which is provided in the turning member 30, in a direction (rearward) leaving from the front pulley 20. However, the elastic member 33 may be provided in the front pulley 20 so that the front pulley 20 receives a force in a direction (frontward) leaving from the turning member 30.

In addition, the elastic member 33 may be provided in both the front pulley 20 and the turning member 30 so that the front pulley 20 and the turning member 30 receive a force in a direction leaving each other.

It is noted that the elastic member 33 is not limited to a coil spring, and various kinds of elastic members maybe used for the elastic member 33. In addition, a position and a structure for fixing the elastic member 33 are not limited.

In addition, in the embodiment, as shown in FIG. 3A, when the screen 10 entirely shadows the inner opening A1, the screen 10 is located in a lower side linear portion of the circular wire 40. However, the roll sunshade device 1 according to the present invention may be configured so that the screen 10 is located in an upper side linear portion of the circular wire 40 when the screen 10 entirely shadows the inner opening A1. In this configuration, when the screen 10 is slid rearward, a rear edge portion of the screen 10 circumferentially moves downward along the roller 31 and turns in the front-rear direction. In addition, when the screen 10 entirely shadows the inner opening A1, since the screen 10 is arranged at a higher position in comparison with the case that the screen 10 is located in the lower side linear portion of the circular wire 40, a large indoor height can be secured.

Figure 4:
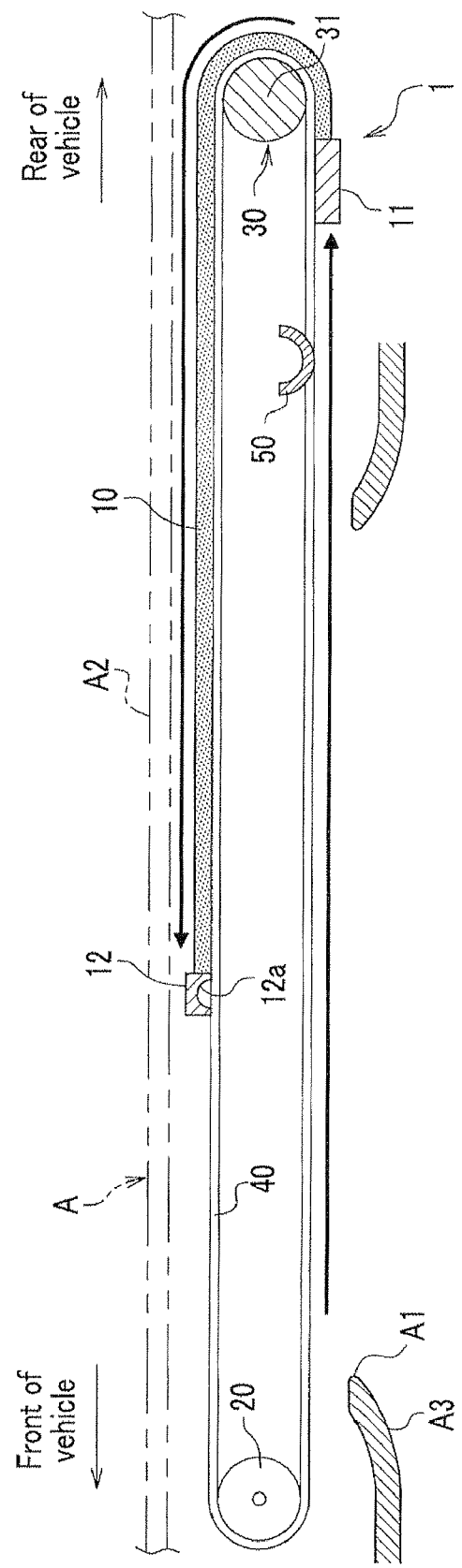
FIG. 4 is a side cross sectional view showing a state where a reversed screen is moved into an inner opening in a roll sunshade device according to another embodiment of the present invention.

In addition, in the embodiment, as shown in FIG. 3B, when the inner opening A1 is entirely opened, the screen 10 is folded in half and housed between the outer roof panel A2 of the vehicle A and the interior headlining board A3. However, as shown in FIG. 4, the rear edge portion of the screen 10 located in the upper linear portion of the circular wire 40 may be moved in the inner opening A1 by further moving the rear stay 12 of the folded screen 10 in the frontward direction. In this case, when the inner opening A1 is entirely shadowed, an upper surface of the screen 10 is exposed inside the vehicle. Therefore, a picture or a pattern may be drawn on the exposed surface inside the vehicle to enjoy as appropriate. As described above, both surfaces of the screen 10 can be efficiently utilized. Meanwhile, a groove 12*a* in the vehicle width direction is formed in the rear stay 12 so that the rear stay 12 can be easily grasped when the rear stay 12 is manually moved.

Figure 5:
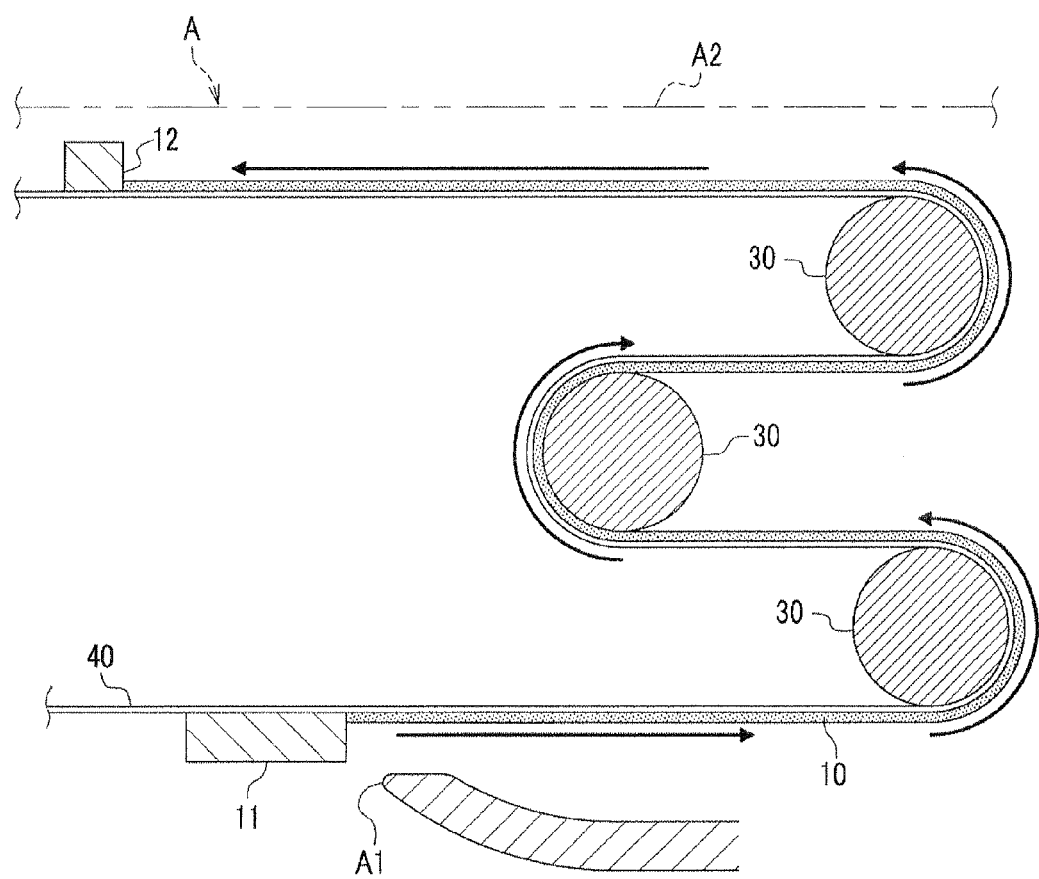
FIG. 5 is a side cross sectional view of a roll sunshade device, where three turning members are used, according to another embodiment of the present invention.

In addition, in the embodiment, as shown in FIG. 3B, the rear edge portion of the screen 10 which is slid in the rearward direction is turned in the front-rear direction by the unified turning member 30. However, as shown in FIG. 5, the screen 10 may be folded in the front-rear direction using three turning members 30, 30, 30 which are arranged in the vertical direction. A unified turning member 30 which is located in the center in height among the three turning members 30, 30, 30, which are arranged in the vertical direction, is located at a more front side position of the vehicle A than the two other turning members 30, 30.

In this case, the screen 10 is folded three times in the front-rear direction along the three turning members 30, 30, 30, and a part of the screen 10 is folded in four layers in the vertical direction. Therefore, when the inner opening A1 is entirely opened, a space for housing the screen 10 can be reduced in the front-rear direction of the vehicle.

Meanwhile, in the feature shown in FIG. 5, the screen 10 may be folded plural times by the turning members 30 more than three. Further, the turning members 30 may be arranged in the front-rear direction instead of the vertical direction. As described above, a space inside the vehicle A can be effectively utilized by changing the arrangement of a plurality of turning members 30 in consideration of a housing space of the screen 10.

What is claimed is:

1. A roll sunshade device, comprising:
   a screen for shadowing an inner opening of a roof of a vehicle;
   a rotating body which is disposed ahead of the inner opening or behind the inner opening in a front-rear direction of the vehicle and rotates freely around an axis in a vehicle width direction;
   a turning member which is disposed at a predetermined distance from the rotating body in the front-rear direction of the vehicle and rotates freely around an axis in the vehicle width direction; and
   two endless circular wires which are disposed on both sides of the inner opening in the vehicle width direction, respectively and hung between the rotating body and the turning member,
   wherein a front edge portion and a rear edge portion of the screen in the front-rear direction of the vehicle are fixed to the two endless circular wires, respectively.

2. The roll sunshade device according to claim 1,
   wherein an elastic member is provided at least in the rotating body or the turning member,
   wherein at least the rotating body or the turning member receives a force by the elastic member in a direction that the rotating body and the turning member leave each other.

* * * * *